(12) United States Patent
Smyth et al.

(10) Patent No.: US 11,553,317 B2
(45) Date of Patent: Jan. 10, 2023

(54) SYSTEM AND METHOD FOR INTERACTION ROUTING BY APPLYING PREDICTIVE ANALYTICS AND MACHINE LEARNING TO WEB AND MOBILE APPLICATION CONTEXT

(71) Applicant: Genesys Telecommunications Laboratories, Inc., Daly City, CA (US)

(72) Inventors: Joseph Smyth, Galway (IE); Ismael Rivera, Galway (IE); Maciej Dabrowski, Galway (IE)

( * ) Notice: Subject to any disclaimer, the term of this patent is extended or adjusted under 35 U.S.C. 154(b) by 776 days.

(21) Appl. No.: 16/352,022

(22) Filed: Mar. 13, 2019

(65) Prior Publication Data

US 2019/0215664 A1 Jul. 11, 2019

Related U.S. Application Data

(62) Division of application No. 14/686,404, filed on Apr. 14, 2015.

(60) Provisional application No. 61/979,479, filed on Apr. 14, 2014.

(51) Int. Cl.
*H04W 4/21* (2018.01)
*H04L 67/02* (2022.01)
*G06N 20/00* (2019.01)

(52) U.S. Cl.
CPC ............ *H04W 4/21* (2018.02); *H04L 67/02* (2013.01); *G06N 20/00* (2019.01)

(58) Field of Classification Search
CPC .......... H04W 4/21; H04L 67/02; G06N 20/00
See application file for complete search history.

(56) References Cited

U.S. PATENT DOCUMENTS

| | | | |
|---|---|---|---|
| 9,015,250 B1 | 4/2015 | Peloski | |
| 2004/0039775 A1* | 2/2004 | Yoshida | G06F 16/954 709/203 |
| 2004/0213400 A1 | 10/2004 | Golitsin | |
| 2014/0249873 A1* | 9/2014 | Stephan | G06Q 10/063 705/7.11 |
| 2014/0288999 A1 | 9/2014 | Ovadia Amsalem | |
| 2015/0172227 A1* | 6/2015 | Grove, II | H04L 51/32 709/206 |

FOREIGN PATENT DOCUMENTS

WO 2014071391 5/2014

* cited by examiner

*Primary Examiner* — Kevin W Figueroa

(57) ABSTRACT

A system and method that pre-configure a telecommunication path between two users across a network. A server communicates an Application Programming Interface (API) to a website of an entity which, when accessed by a first user at a remote terminal, loads the API into the user terminal, captures data representative of the interaction of the first user with the website in real time, and communicates the data across the network to the server. The server compares the data with stored attributes of second users to identify a matching second user. The data is analyzed and used to predict a successful outcome between the two users. The server selects a network address of the matched second user, and, upon initiation of a telecommunication with the entity by the first user, routes the telecommunication to the network address and communicates the data to a second terminal of the matched second user.

12 Claims, 7 Drawing Sheets

SYSTEM AND METHOD FOR INTERACTION ROUTING BY APPLYING PREDICTIVE ANALYTICS AND MACHINE LEARNING TO WEB AND MOBILE APPLICATION CONTEXT

CROSS REFERENCE TO RELATED APPLICATIONS

This application is a continuation of U.S. patent application Ser. No. 14/686,404, titled "System and Method for Interaction Routing by Applying Predictive Analytics and Machine Learning to Web and Mobile Application Context", filed on 14 Apr. 2015, which also claims priority to and claims the benefit of U.S. Provisional Patent Application 61/979,479, filed on 14 Apr. 2014, the specifications of which are hereby incorporated herein by reference.

BACKGROUND OF THE INVENTION

Field of the Invention

The application relates to a system and method for the interaction of Web Sites, Mobile Apps, Analytics and Contact Centers (Call Centers) through the use of technologies such as Predictive Analytics, Machine Learning, WebRTC and VoIP plugins for browsers.

Description of the Related Art

Nowadays, customers typically begin and conduct their interaction with a goods or service provider via the provider's website or mobile application, which are fast becoming the primary interfaces for organizations to communicate with their customers, suppliers and other stakeholders.

Traditional Contact Center routing to Customer Care Agents is done via data derived from telephony parameters—e.g. Calling Line ID or via simple choices made by customers via DTMF tones in Interactive Voice Response Sessions—e.g. Press 1 for Sales, 2 for Support, etc.

There is now a completely new paradigm possible for Call Centers whereby the Customer begins the business interaction via the Business Web Site or Mobile App, which are now the primary interfaces for businesses to support their customers. With the emergence of technologies like VoIP and WebRTC it is possible to build the Voice and Video functionality directly into the Web Site and Browser or Mobile App based experience. This mechanism no longer requires a customer to even have a phone number as the Media Path is established peer-to-peer between the Caller and the Callee's Browser or Mobile App.

The growing adoption of WebRTC, which is a proposed HTML5 standard, and further Internet-based telecommunications developments by the likes of Google®, Cisco and others, for instance telephony plugins for web browsers such as GoogleTalk® or Cisco's Jabber Guest have made it possible to build Unified Communications functions directly into browsers, to be invoked ad hoc by relevant embedded features of entity websites.

However, known implementations still only use such Unified Communications plugins to initiate calls via telephony protocols, such as SIP, into the PSTN, or an Enterprise PBX and then route the calls using traditional methods like Calling Line ID or Dialed Number, together with either interactive voice response-based authentication (e.g. "enter your identifier") or basic call routing (e.g. "press 1 for support, press 2 for sales"). Accordingly, such implementations still only use browsers as a gateway into the known and traditional PSTN/PBX-based telecommunication model.

Interlocutors receiving such calls must thus rely upon either any details about the calling user which their data systems may already hold, particularly if such a call is the first-ever real-time interaction of a customer with the entity associated with the website, or even both.

It is known to refine captured data with analytical data processing tools which track customer behavior and usage of online resources, like for instance Google Analytics® which analyses website browsing patterns, however the output of such tools is usually aggregated and anonymized data, so are not suitable to support an intuitive and personalized experience for both of a calling user and their eventual interlocutor. Other tools (e.g. Marketo or Hub Spot) will rank visitors based on activities on the Website. However these tools do not apply in extending this personalization to a Contact Centre mainly due to loss of context when a customer switches communication to a telephone or other audio communication means. Other patent publications in the art include US2004/039775 and WO2014/071391, however again the systems and methods disclosed do not provide a satisfactory level of personalization for users interacting with a website.

An improved method of routing calls of website users to relevant interlocutors acting for the entities associated with the websites is therefore required, and a system embodying this method, which mitigate at least the above shortcomings of the prior art.

BRIEF SUMMARY OF THE INVENTION

The inventors have realized that emergent Wide Area Network telecommunication technologies such as Voice-over-IP ("VoIP") and WebRTC and analytic online data processing techniques can provide a synergistic effect when combined.

The invention, as set out in the appended claims, provides techniques for routing remote interactions of users of web sites, mobile applications and comparable network-distributed resources to relevant interlocutors of entities associated with these network-distributed resource, based on the collection and analysis of data representative of, for instance, user search terminology, webpage tags and meta-data, historical or sequential user page and link selections, user social media data and the like. The techniques of the invention can usefully be augmented with conducting such data analytics functions substantially in real-time, both for pre-configuring a telecommunication of a user with one or more remote interlocutors on the fly, as the user keeps interacting with one or more network-distributed resources and at least until the user initiates such a telecommunication.

Accordingly, in a first aspect of the invention, a method of pre-configuring a telecommunication path between at least two users across a network is provided, which comprises the steps of communicating at least a first Application Programming Interface (API) to a website of an entity; and, when the website is accessed at a first terminal operated by a first of the said at least two users, loading the first API at the first terminal; capturing data representative of the interaction of the first user with the website at the first terminal with the first API in real time; communicating the captured data across the network to remote data processing means; comparing the communicated captured data with attributes of a plurality of second users stored at the remote data processing means for identifying a matching second user wherein the captured data is analyzed based on a pattern and used to predict a successful outcome between the first user and the matched second user; and when the first user initiates a telecommunication with the entity, selecting a network address of the matched second user at the remote data processing means; routing the telecommunication to the selected network address; and communicating at least a portion of the communicated captured data to a second terminal operated by the selected second user.

In an embodiment the captured data comprises personae and activity user data and compared with stored attributes to identify the matching second user.

In an embodiment the pattern used to predict a successful outcome is based on a machine learning step comprising a clustering technique to cluster specific patterns of captured data and store over time for comparison with new captured data.

An embodiment of the method may advantageously comprise the further step of inputting social media or other authentication data of the first user when the website is accessed. Other authentication data includes, but not limited to, passwords or any private authentication service based on OAUTH2, AAA or similar.

In an embodiment of the method, the step of communicating the captured data across the network to the remote data processing means may be performed in real time.

In an embodiment of the method, the step of routing further may comprise selecting a telecommunication protocol and a network path between the first and second users.

In a variant of this embodiment, the telecommunication protocol may be selected for character-based messaging, audio-only or audio-video telecommunication. In a further variant of this embodiment, the network path may be selected from at least one of VoIP, WebRTC, Jabber Guest; PSTN or other network path.

For any of these variants, the method step of selecting preferably further comprises selecting the protocol and/or path as a function of the telecommunication functionalities of the first terminal and the capabilities of the first user's network connection.

In a further aspect of the invention, a system is also provided for pre-configuring a telecommunication path between at least two users across a network, comprising a server for communicating at least a first Application Programming Interface (API) to a website of an entity; a network-connected terminal operated by a first of the said at least two users and configured, upon access to the website, to load the first API, capture data representative of the interaction of the first user with the website in real time, and communicate the captured data across the network to the server; and a second network-connected terminal operated by the second of the said at least two users; wherein the server is further configured to compare the communicated captured data with stored attributes of a plurality of second users for identifying a matching second user wherein the captured data is analyzed based on a pattern and used to predict a successful outcome between the first user and the matched second user, select a network address of the matched second user and, upon initiation of a telecommunication with the entity by the first user, route the telecommunication to the selected network address, and communicate at least a portion of the communicated captured data to the second terminal.

In an embodiment of the system, the first terminal may be further configured to require inputting of social media or other authentication data by the first user when the website is accessed.

In an embodiment of the system, the first terminal may be further configured to communicate the captured data across the network to the server in real time.

In an embodiment of the system, the server may be further configured to select a telecommunication protocol and a network path between the first and second users. The telecommunication protocol may again be selected for character-based messaging, audio-only or audio-video telecommunication. The network path may again be selected from VoIP, WebRTC and PSTN.

In an embodiment of the system, the server may be further configured to select as a function of the telecommunication functionalities of the first terminal and the capabilities of the first user's network connection.

According to yet another aspect of the present invention, there is also provided a set of instructions recorded on a data carrying medium which, when processed by a first data processing terminal of an entity connected to a network, configures the terminal to perform the steps of communicating at least a first Application Programming Interface (API) to a website of an entity; causing the API to, when the website is accessed at a second data processing terminal: load at the second terminal; capture data representative of the interaction of a first user with the website at the second terminal in real time; communicate the captured data across the network to the first data processing terminal; compare the communicated captured data with attributes of a plurality of second users stored at the second data processing means for identifying a matching second user wherein the captured data is analyzed based on a pattern and used to predict a successful outcome between the first user and the matched second user; and when the first user initiates a telecommunication with the entity, of selecting a network address of the matched second user at the first terminal; routing the telecommunication to the selected network address; and communicating at least a portion of the communicated captured data to a terminal operated by the selected second user.

The set of instructions may be advantageously embodied as an application package file ('APK') for use with the Android™ operating system or embodied as an iPhone™ application archive ('IPA') for use with the iOS™ operating system.

For any of the above embodiments and further variants, data representative of the interaction preferably comprises at least one selected from website data, website metadata, webpage page tags, website cookies, website page headers, one or more user input or 'click' streams, one or more search strings, a website navigation record representative of historical or sequential user page and link selections, and user social media data.

For any of the above embodiments and further variants, the stored attributes of second users are preferably selected from alphanumeric, semantic, contextual and/or social media data uniquely associated with each of the plurality of second users.

For any of the above embodiments and further variants the captured data comprises personae and activity user data and compared with stored attributes to identify the matching second user.

In an embodiment there is provided a machine learning step or module wherein the captured data is analyzed based on a pattern and used to predict a successful outcome between a first user and selected second user.

In an embodiment there is provided a machine learning step or module comprises a clustering technique to cluster specific patterns of captured data and store over time for comparison with new captured data.

For any of the above embodiments and further variants, the website may be a mobile application site or portal associated with the entity capable of communicating with an application, or 'app', downloaded onto a terminal.

For any of the above embodiments and further variants, any one of the plurality of data communication terminals and server may selected from the group comprising desktop computers, mobile telephone handsets, tablet computers, portable computers, personal digital assistants, portable media players, portable game consoles.

Other aspects are as set out in the claims herein.

BRIEF DESCRIPTION OF THE DRAWINGS

The above and other aspects, features and advantages of at least one embodiment of the invention will be more apparent from the following more particular description thereof, presented in conjunction with the following drawings, wherein.

DETAILED DESCRIPTION OF THE INVENTION

The following description is of the best mode presently contemplated for carrying out at least one embodiment of the invention. This description is not to be taken in a limiting sense, but is made merely for the purpose of describing the general principles of the invention. The scope of the invention should be determined with reference to the claims.

Figure 1:
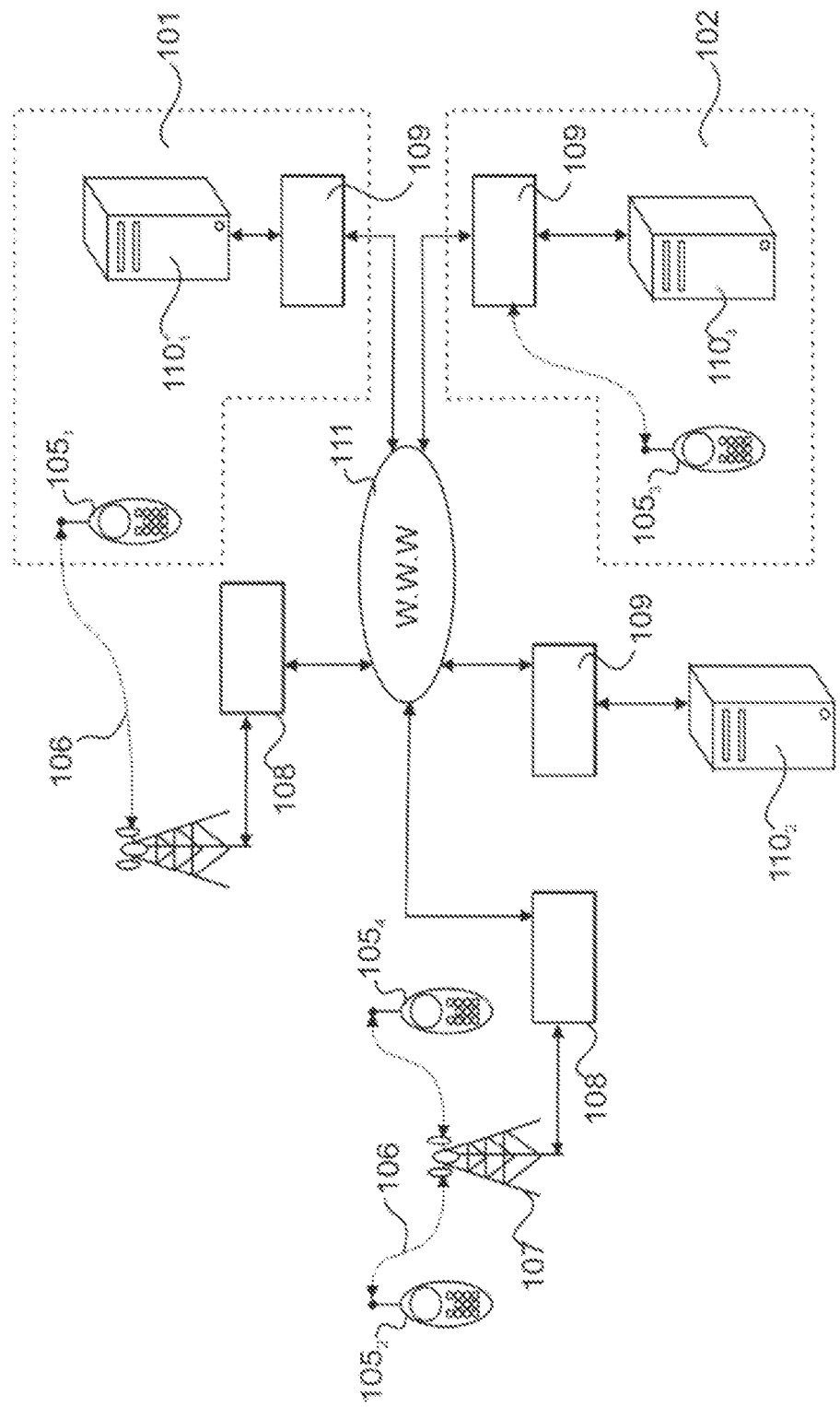
FIG. 1 shows a network environment comprising a communication network and a plurality of data processing devices, consisting of both mobile and static terminals.

With reference to FIG. 1, an example embodiment of a system 100 according to the invention is shown within a networked environment. The networked environment includes a plurality of data processing devices, consisting of both mobile and static data processing terminals $105_N$, $110_N$ each capable of at least data communication with one another across a network including a Wide Area Network ('WAN') 111 such as the World Wide Web or Internet.

In the example, each mobile data communication device $105_N$ is a mobile telephone handset 105 having wireless telecommunication emitting and receiving functionality over a cellular telephone network configured according to the Global System for Mobile Communication ('GSM'), General Packet Radio Service ('GPRS'), International Mobile Telecommunications-2000 (IMT-2000, 'W-CDMA' or '3G'), International Mobile Telecommunications-Advanced, (ITU-R-compliant and known as '4G') network industry standards, and wherein telecommunication is performed as voice, alphanumeric or audio-video data using the Short Message Service ('SMS') protocol, the Wireless Application protocol ('WAP') the Hypertext Transfer Protocol ('HTTP') or the Secure Hypertext Transfer Protocol ('HTTPS').

Each mobile telephone handset $105_N$ receives or emits voice, text, audio and/or image data encoded as a digital signal over a wireless data transmission 106, wherein the signal is relayed respectively to or from the handset by the geographically-closest communication link relay 107 of a plurality thereof. The plurality of communication link relays 107 allows digital signals to be routed between each handset 105 and their destination by means of a remote gateway 108 via a MSC or base station 109. Gateway 108 is for instance a communication network switch, which couples digital signal traffic between wireless telecommunication networks, such as the cellular network within which wireless data transmissions 106 take place, and the Wide Area Network 111. The gateway 108 further provides protocol conversion if required, for instance whether a handset 105 uses the WAP or HTTPS protocol to communicate data.

Alternatively, or additionally, one or more of the plurality of mobile data communication device $105_N$ may have wired and/or wireless telecommunication emitting and receiving functionality over, respectively, a wired Local Area Network ('LAN') and/or a wireless local area network ('WLAN') conforming to the 802.11 standard ('Wi-Fi'). In the LAN or WLAN, telecommunication is likewise performed as voice, alphanumeric and/or audio-video data using the Internet Protocol (IP), Voice data over IP ('VoIP') protocol, Hypertext Transfer Protocol ('HTTP') or Secure Hypertext Transfer Protocol ('HTTPS'), the signal being relayed respectively to or from the mobile data communication device 105 by a wired (LAN) or wireless (WLAN) router 109 interfacing the mobile data communication device 105 to the WAN communication network 111. A mobile telephone handset 105 may have wireless telecommunication emitting and receiving functionality over the WLAN in addition to GSM, GPRS, W-CDMA and/or 3G, ITU-R/4G.

A typical handset $105_N$ for use with the system according to the invention is preferably that commonly referred to as a 'smartphone' and may for instance be an iPhone™ handset manufactured by the Apple Corporation or an equivalent handset configured with the Android™ operating system provided by Google, Inc. Generally, the mobile terminal 105 may be any portable data processing device having at least wireless communication means and audio recording and storage means. It will therefore be readily understood by the skilled person from the present disclosure, that one or more of the mobile data communication devices 105 may instead be a portable computer commonly referred to as a 'laptop' or 'netbook', a tablet computer such as an Apple™ iPad™ or a Samsung™ Galaxy™, and the like.

Figure 2:
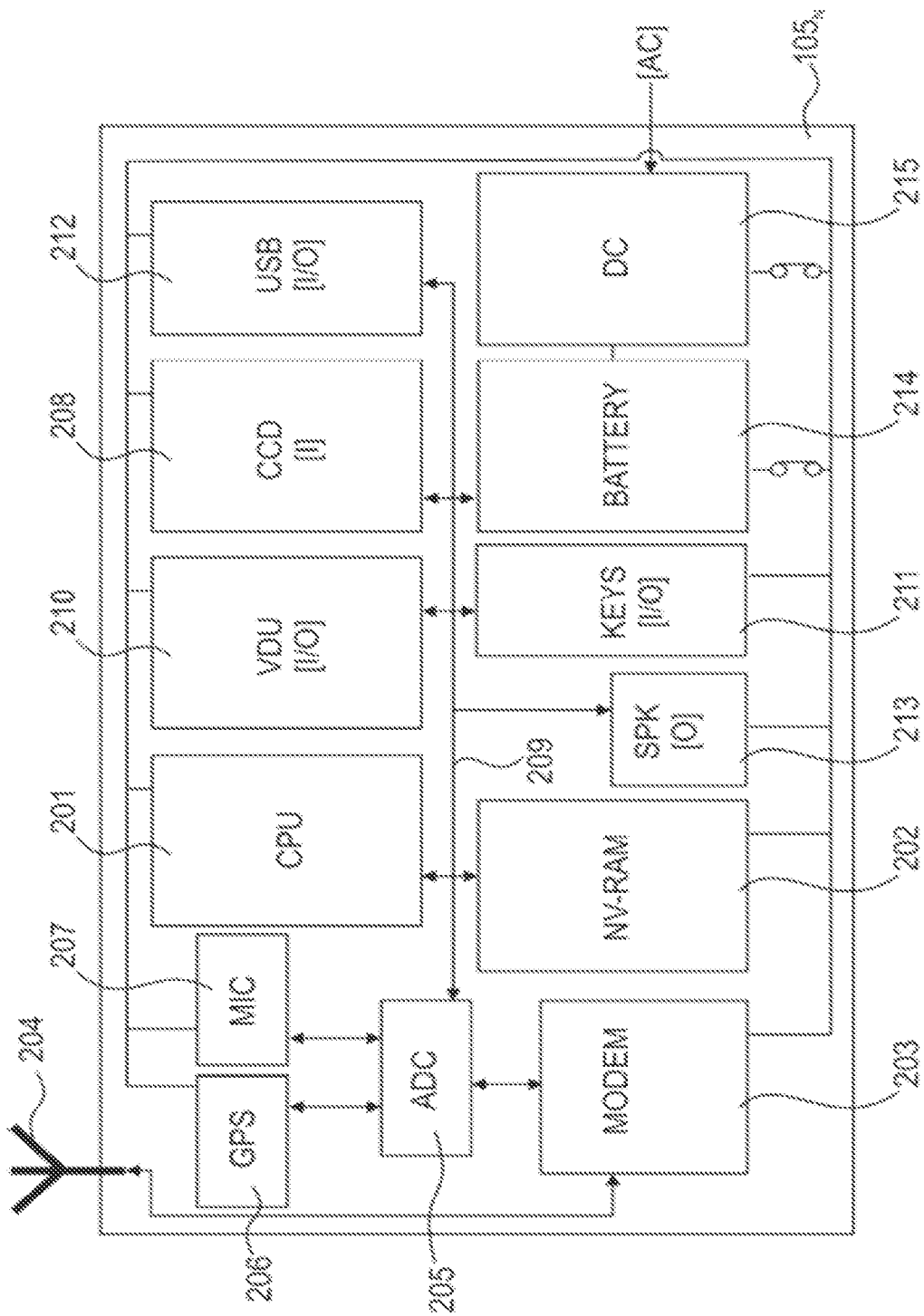
FIG. 2 is a logical diagram of a typical hardware architecture of a mobile data processing and communication terminal shown in FIG. 1, including memory means.

Accordingly, a typical hardware architecture of a mobile telephone handset $105_N$ is shown in FIG. 2 in further detail, by way of non-limitative example. The handset 105 firstly includes a data processing unit 201, for instance a general-purpose microprocessor (CPU), acting as the main controller of the handset 105 and which is coupled with memory means 202, comprising non-volatile random-access memory ('NVRAM').

The mobile telephone handset 105 further includes a modem 203 to implement the wireless communication functionality, as the modem provides the hardware interface to external communication systems, such as the GSM or GPRS cellular telephone network 107, 108 shown in FIG. 1. An aerial 204 coupled with the modem 203 facilitates the reception of wireless signals from nearby communication link relays 107. The modem 203 is interfaced with or includes an analogue-to-digital converter 205 ('ADC') for demodulating wavelength wireless signals into digital data, and reciprocally for outgoing data.

The handset 105 further includes self-locating means in the form of a GPS receiver 206, wherein the ADC 205 receives analogue positional and time data from orbiting satellites (not shown), which the data processing unit 201 or a dedicated data processing unit processes into digital positional and time data.

The handset 105 further includes a sound transducer 207, for converting ambient sound waves, such as the user's voice into an analogue signal, which the ADC 205 receives for the data processing unit 201 or a dedicated data processing unit to process into digital first audio data.

The handset 105 may optionally further include imaging means 208 in the form of an electronic image sensor, for capturing image data which the data processing unit 201 or a dedicated data processing unit processes into digital image data.

The CPU 201, NVRAM 202, modem 203, GPS receiver 206, microphone 207 and optional digital camera 208 are connected by a data input/output bus 209, over which they communicate and to which further components of the handset 105 are similarly connected, in order to provide wireless communication functionality and receive user interrupts, inputs and configuration data.

Alphanumerical and/or image data processed by CPU 201 is output to a video display unit 210 ('VDU'), from which user interrupts may also be received if it is a touch screen display. Further user interrupts may also be received from a keypad 211 of the handset, or from an external human interface device ('HiD') connected to the handset via a Universal Serial Bus ('USB') interface 212. The USB interface advantageously also allows the CPU 201 to read data from and/or write data to an external or removable storage device. Audio data processed by CPU 201 is output to a speaker unit 213.

Power is provided to the handset 105 by an internal module battery 214, which an electrical converter 215 charges from a mains power supply as and when required.

The system 100 next includes one or more data processing terminals $110_N$, each of which emits and receives data encoded as a digital signal over a wired data transmission conforming to the IEEE 802.3 ('Gigabit Ethernet') standard, wherein the signal is relayed respectively to or from the computing device by a wired router 109 interfacing the computing device 110 to the WAN communication network 111. Generally, each data processing terminal $110_N$ may be any portable or desktop data processing device having at least networking means apt to establish a data communication with the plurality of mobile data communication devices $105_N$.

Figure 3:
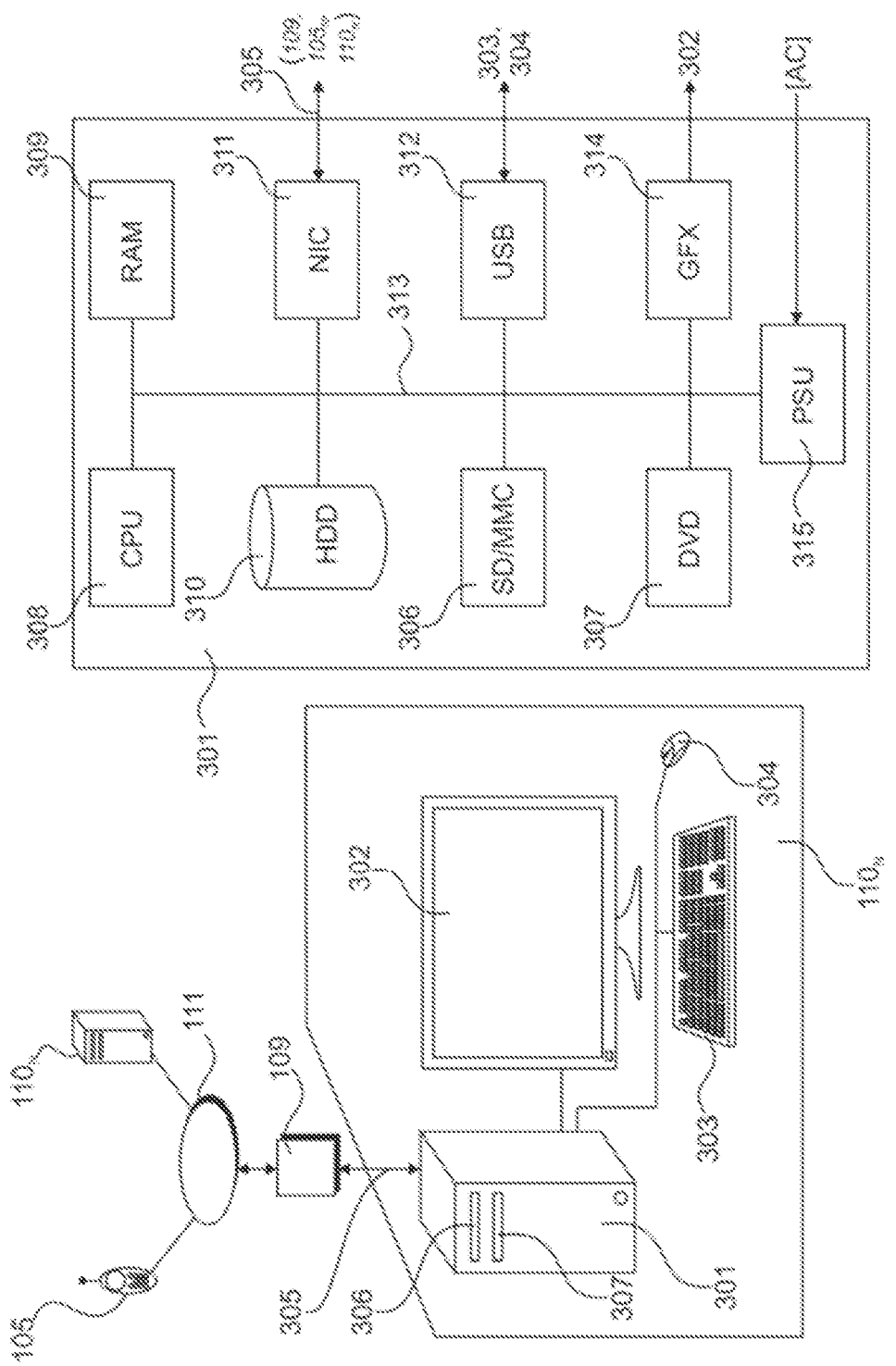
FIG. 3 is a logical diagram of a typical hardware architecture of a static data processing terminal shown in FIG. 1, including memory means.

A typical hardware architecture of a data processing terminals $110_N$ is shown in FIG. 3 in further detail, by way of non-limitative example. The data processing device 110 is a computer configured with a data processing unit 301, data outputting means such as video display unit (VDU) 302, data inputting means such as HiD devices, commonly a keyboard 303 and a pointing device (mouse) 304, as well as the VDU 302 itself if it is a touch screen display, and data inputting/outputting means such as the wired network connection 305 to the communication network 111 via the router 109, a magnetic data-carrying medium reader/writer 306 and an optical data-carrying medium reader/writer 307.

Within data processing unit 301, a central processing unit (CPU) 308 provides task co-ordination and data processing functionality. Sets of instructions and data for the CPU 308 are stored in memory means 309 and a hard disk storage unit 310 facilitates non-volatile storage of the instructions and the data. A wireless network interface card (NIC) 311 provides the interface to the network connection 305. A universal serial bus (USB) input/output interface 312 facilitates connection to the keyboard and pointing devices 303, 304.

All of the above components are connected to a data input/output bus 313, to which the magnetic data-carrying medium reader/writer 306 and optical data-carrying medium reader/writer 307 are also connected. A video adapter 314 receives CPU instructions over the bus 313 for outputting processed data to VDU 302. All the components of data processing unit 301 are powered by a power supply unit 315, which receives electrical power from a local mains power source and transforms it according to component ratings and requirements.

In the example, any user operating a mobile terminal $105_2$, $105_4$ or static terminal $110_2$ may access the website of an entity 101 providing commercial goods or services for obtaining information about the entity and/or its goods or services. The entity 101 accordingly operates a static terminal $110_1$ configured as a web server for distributing the website to requesting remote terminals $105_2$, $105_4$ and/or $110_2$, and at least one interlocutor at the entity operates a mobile terminal $105_1$ for meeting any ad hoc telecommunication requirements of their users. The entity 101 also has the use of one or more interlocutors at a remote call center entity 102, which operates both a static terminal $110_3$ and a mobile terminal $105_3$ for telecommunication support and assistance.

Figure 4:
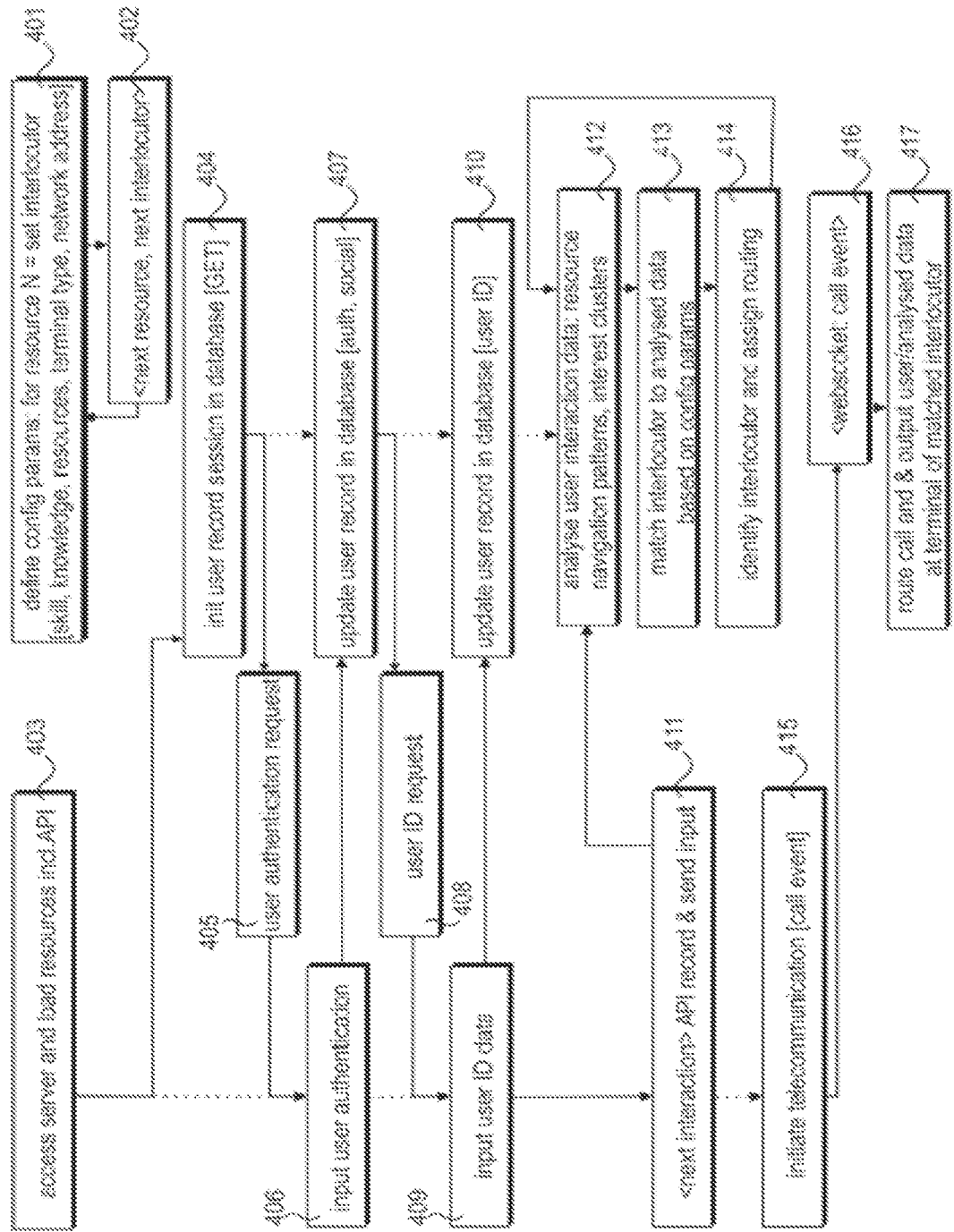
FIG. 4 details data processing steps of an embodiment of the method of the invention, wherein the plurality of data processing devices of FIGS. 1 to 3 communicate data and sets of instructions therebetween.

FIG. 4 details the data processing steps of an embodiment of the method, performed in the environment of FIGS. 1 to 3 with the user data processing terminal $105_2$ and the entity data processing terminals $110_1$ and $105_1$.

In a simple embodiment of the method, a local user application is served by the entity server $110_1$ to the user mobile terminal 1052 accessing the entity website, which exposes at least one Application Programmer Interface ('API') passing the user input data representative of the user interactions to an analyzing and routing application hosted by the server $110_1$. When the mobile terminal $105_2$ accesses the website at the server PC $110_1$, the API is loaded and then captures and communicates user interaction data to the server $110_1$ substantially in real time. The server application analyses the communicated captured data for matching the user's interests, as derived from the analyzed interaction data, with one or more interlocutors associated with the entity, who is or are most apt to interact with the user in any real-time telecommunication which may follow the user's interaction with the website, e.g. a specialist interlocutor with relevant training in such derived interests. Whenever the user should initiate a real-time telecommunication, for instance with selecting a 'call', 'chat', 'videoconferencing' (and equivalents) button in a webpage, the server application routes any such telecommunication to the terminal $105_1$ or $105_3$ or $110_3$ of the matched interlocutor, preferably with the analyzed and/or captured data.

A real-time telecommunication between a user and a matched interlocutor will be routed as a media path using any of alphanumerical (e.g. Instant Messaging), voice-only (e.g. telephone) or voice & video (e.g. Skype™) formats, within any of the VoIP, WebRTC or PSTN network structures depending how the user is accessing the website (e.g. desktop or laptop PC $110_2$, tablet or smartphone $105_2$).

Accordingly, configuration parameters including interlocutor data, telecommunication formats and routing options and rules should first be input at the server $110_1$ into a database processed by the server application at step 401. Interlocutor data will comprise characteristics for each interlocutor, such as name, areas of training and/or topical specialty, keywords and other logical and/or semantic distinguishing parameters, as well as respective terminal type, communication and functional capabilities in respect of the above formats and structures, an importantly at least one network address for each interlocutor terminal. As many such interlocutor records may be input as there are potential interlocutors for a calling user, and recorded interlocutors may receive further training to expand their telecommunication aptitude, whereby new interlocutor records may be instantiated, and current new interlocutor records may be updated at step 402, whereby control logically returns to step 401.

In parallel with the above, at any given time, a user at a terminal $105_2$, $110_2$ may access the server $110_1$ for loading and perusing the entity website in a new browsing session at step 403. The server $110_1$ accordingly creates a new user session record in the database at step 404, and makes access to the website resources conditional upon a login authentication step at step 405. The user subsequently inputs relevant authentication input data at terminal $105_2$ at step 406, for instance a user name and/or login credential data of an online social media resource. Such authentication input data is forwarded to the server $110_1$ at step 407, at which it is recorded in the user session record.

The server $110_1$ may optionally make access to the website resources conditional upon a secondary identity verification step at step 408. The user subsequently inputs relevant identity input data at terminal $105_2$ at step 409, for instance a first name at least. Such identity verification input data is again forwarded to the server $110_1$ at step 410, at which it is again recorded in the user session record.

The user subsequently accesses and peruses the website resources, including any or all of website data, website metadata, webpage page tags, website cookies, website page headers, user social media data through conventional user page and link selections, at step 411. The user thus generates a stream of selections with e.g. mouse 304, known as a clickstream, and may also input one or more search strings for locating website resources. The API captures and communicates this interaction data substantially in real-time at step 411, whether as interaction event-driven updates or in aggregate form, for instances as a website navigation record representative of historical or sequential clicks, or as a combination of both in dependence on bandwidth or load constraints.

The communicated captured interaction data is received by the server application at server $110_1$ and analyzed to step 412 using various statistical predictive analytics techniques such as Bayesian inferencing or regression models that are known in the art. The user's interaction pattern is determined by the server application and an interaction prediction is output, such as when a customer will initiate a telecommunication call, or may cease to peruse the webpage or website. The interaction prediction is used to trigger a matching operation at step 413 of the user with a respective recorded interlocutor, which is accomplished by comparing the interaction pattern with interlocutor parameters, in particular areas of training and/or topical specialty and keywords, and determining the recorded interlocutor with the closest record correlating the interaction pattern.

At step 414, the matching interlocutor record is selected and the routing path between the user and the selected interlocutor is determined based on the network address of the interlocutor terminal recorded in the database whereby, if the user should initiate a real-time telecommunication call from the website substantially at that time according to the prediction at step 415, the server $110_1$ receives the corresponding event call message at step 416 and the server application routes the call to the selected interlocutor at step 417, together with either the user's interaction pattern, or the captured and communicated user interaction data, or both.

The server application at the server $110_1$ is a multi-threaded application apt to perform each of steps 401, 402,m 404, 407, 410, 412 to 414 and 416, 417 substantially concurrently for a plurality of interacting users and a plurality of interlocutors, and steps 412 to 414 themselves form a looping subroutine of the application whereby, should a user not initiate a predicted telecommunication call at step 415, a subsequent captured and communicated interaction of the user translating a shifting point of interest would be processed at a next iteration of steps 412 to 414 and optimally result in potentially a different matched interlocutor with a respective different, but more relevant, set of parameters correlating with the shifted point of interest.

It will be appreciated that the agent (Website hosts. App providers) can setup the positive and negative Outcomes they wish to achieve/avoid—simple ones being "Purchase" or "Support Ticket Closure", more complex ones being "Openness to Sales engagement". The invention provides a Machine Learning component can determine which customers when offered Calls, Chat, Emails, Web Page Suggestions are more likely to complete the desired Outcome. The machine learning component or module captures the data and is analyzed based on a pattern and used to predict a successful outcome between a first user and selected second user. In one embodiment the machine learning component or module comprises a clustering technique to cluster specific patterns of captured data and store over time for comparison with new captured data.

The Outcome is captured in a binary fashion at the end of each call or session by either the Agent or by the system retrieving the Outcome programmatically from a CRM or Ticketing system that the agent entered the Outcome into or upon user completion of a sequence of actions defining an outcome. This forms the feedback loop for the system to understand persona/activity patterns that drive good Outcomes vs. bad Outcomes.

Based on this mechanism the system can offer Chats and Calls to Customers most likely to convert who would have otherwise not converted. This is important, as the pool of Agents is always limited. Therefore Agent time is geared to calls, chats (Interactions) with customers that have the best likelihood to maximize the defined Outcome.

If an agent or business does not initially want to allow the system to make the actual call/chat offers then the Machine Learning can be used to present ranked lists of Customers and/or actions to the Agent for a specific Outcome who can then be manually offered a call or a chat at the discretion of the Agent.

Figure 5:
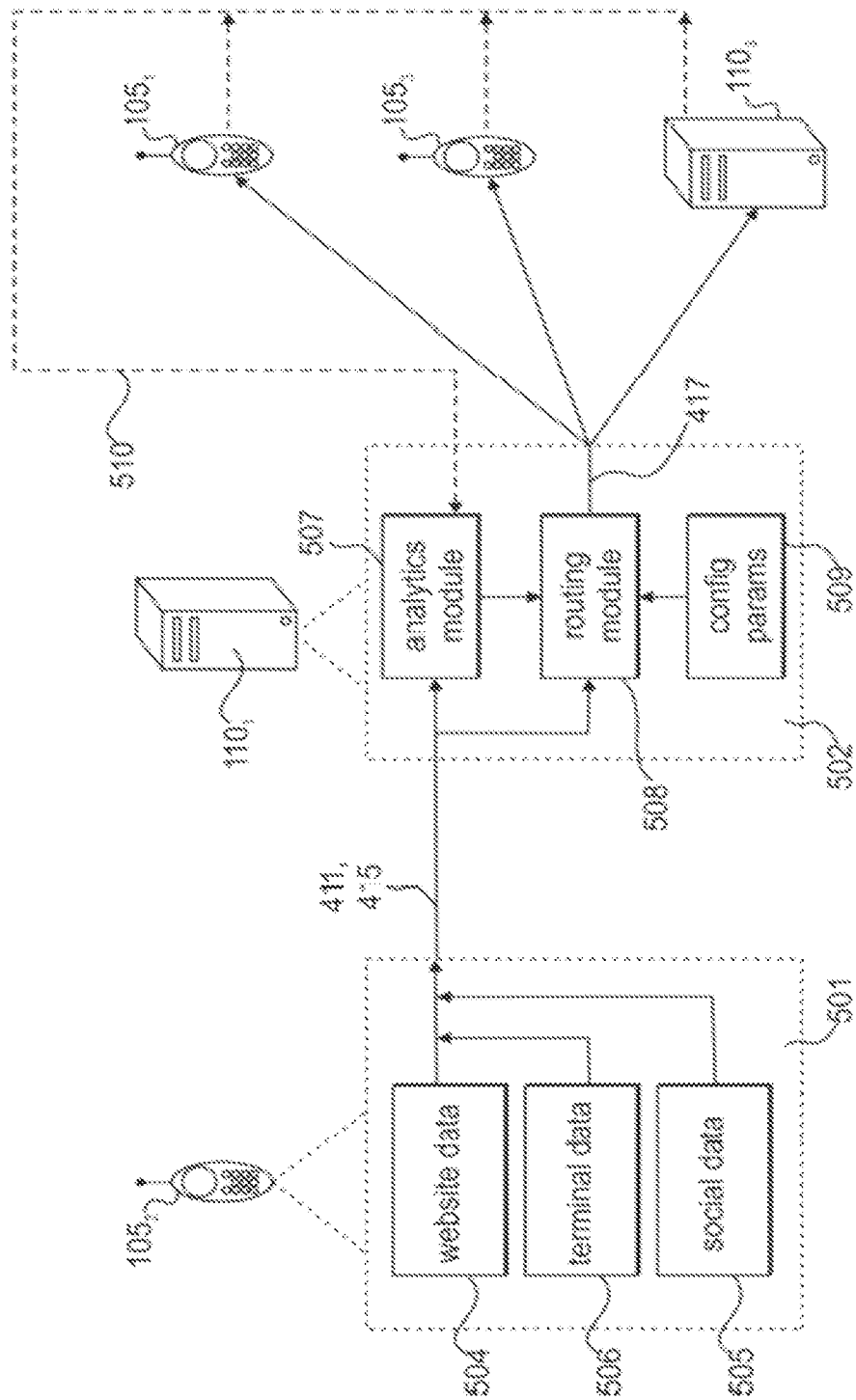
FIG. 5 is a block diagram illustration of the method of FIG. 4 implemented in the system of FIGS. 1 to 3.

FIG. 5 is a block diagram illustration of a high-level implementation of the method of FIG. 4 within the system 100 in the environment of FIGS. 1 to 3 at runtime.

The steps of the method may usefully be implemented in the system 100 as a user application 501 processed in conjunction with the browser of a user mobile terminal $105_2$, $105_4$, which exposes one or more APIs to the website of the entity 101; a server application 502 processed by the entity terminal $110_1$ with an associated, highly scalable database; and an interlocutor application, at its simplest a browser processed by the mobile or static terminal $110_3$, $105_1$, $105_3$ of the interlocutor to whom a telecommunication initiated by the user is routed by the server application 502 that can be interpreted as an interactive management engine.

The user application 501 captures website data 504, such as cookies, web page headers and the like as the user interacts therewith on their mobile terminal $105_2$, besides the social media data 505 gathered when the user logs into the website using social media-based authentication at step 406 and terminal data 506 indicative of at least the terminal type, and sends the captured data to the server application 502 per step 411.

The server application 502 is an analytics and routing application comprising a database, an analytics module 507, a routing module 508 and a parameterizing module 509, and which processes the captured user data it receives for identifying a relevant interlocutor associated with the entity 101 deemed most relevant, and routing an eventual telecommunication of the user thereto. The server application performs steps 401, 402, 404, 405, 407, 408, 410, 412 to 414 and 416, 417.

The parameterizing module 509 specifically performs steps 401 and 402, i.e. it is used for defining the attributes of each interlocutor in relation to the website data in logical and e.g. semantic terms, the attributes of interlocutor terminals $110_3$, $105_1$, $105_3$ and the attributes of telecommunication links with user terminals $105_2$, $105_4$ and such as terminal type, associated communication functionalities, minimum bandwidth levels for ensuring Quality of Service per communication type.

The analytics module 507 specifically performs steps 412 to 414, i.e. it receives all of the user data captured by the user application 501, thus including e.g. website data, website metadata, webpage page tags, website cookies, website page headers, one or more clickstream, one or more search strings, a website navigation record representative of historical or sequential user page and link selections, and user social media data.

The routing module 508 specifically performs steps 416 and 417, i.e. it is triggered by a telecommunication call event and routes the user call to the selected interlocutor terminal $105_1$, $105_3$, $110_3$ with the output of the analytics module 507 and optionally also the captured user interaction data received pursuant to step 411.

Figure 6:
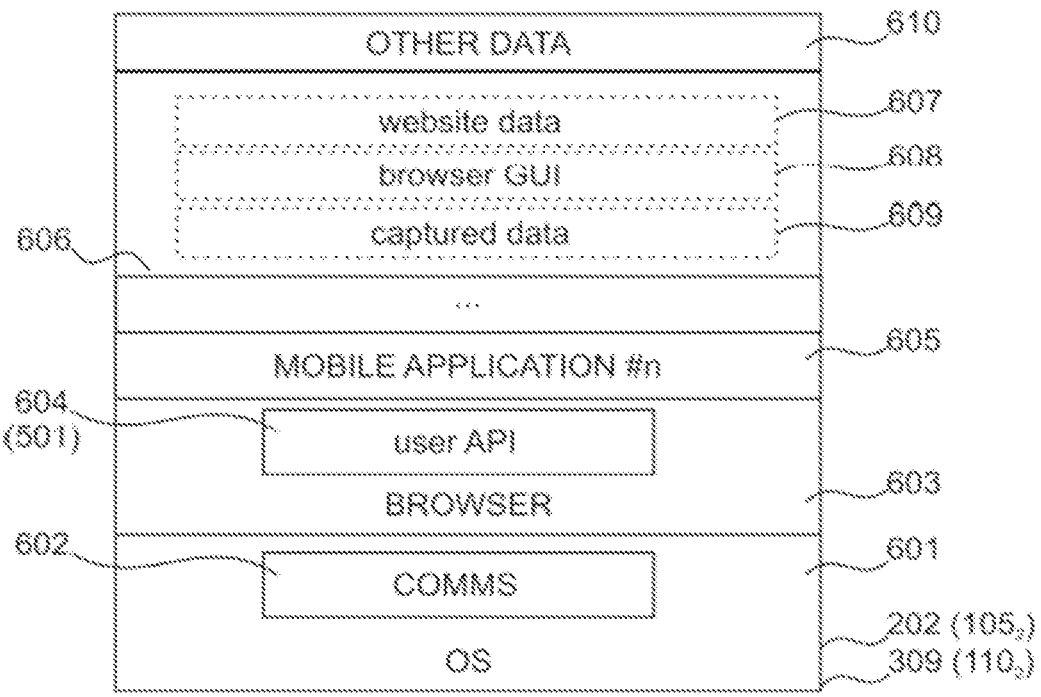
FIG. 6 is a logical diagram of the contents of the memory means of the user mobile terminal shown in FIGS. 1 and 2, when performing the method of FIG. 4 as a user terminal, including a website, captured interaction data and a first set of instructions.

FIG. 6 is a logical diagram of the contents of the memory means 202 of the user mobile terminal $105_2$ as shown in FIGS. 1 and 2, when performing the method of FIG. 4 at runtime, including a website in a browser, a first set of instructions and captured interaction data as illustrated in FIG. 5. It will be readily understood by the skilled person that the foregoing is applicable to the alternative memory means 309 of a user static terminal $110_2$ as shown in FIGS. 1 and 3, when performing the method of FIG. 4 at runtime.

An operating system is firstly shown at 601 which, depending on the handset manufacturer, may be an iOS version developed and distributed by Apple Inc. or Android™ developed and distributed by Google Inc. A subset of instructions 602 of the OS 601 is dedicated to communication processing, in particular data communications with remote terminals $105_N$, $110_N$ within the network environment of FIG. 1.

A browser application is shown at 603, which configures the mobile handset $105_2$ to access, process and display the website resources hosted by the remoter entity server $110_1$. A set of instructions 604 corresponds to the user application 501 and is dedicated to implementing the functionality of steps 406, 409 and 411 as previously described and which is interfaced with the browser application 602 and the network layer of the OS 601. The memory 202 may comprise one or more further applications being processed in parallel with the browser and API 603, 604 at runtime, that is or are unrelated to the present invention and generally shown at 605.

Browser application data is shown at 606, which comprises accessed website resources 607 downloaded from the remote server $110_1$ and a graphical user interface 608 output to the display 210 and into which the downloaded resources are rendered.

User application data is shown at 609, which comprises the captured website data, website metadata, webpage page tags, website cookies, website page headers, one or more clickstream, one or more search strings, a website navigation record representative of historical or sequential user page and link selections, user social media data and the like being sent to the remote server application 502 at the remote server $110_1$.

The memory 202 may further comprise conventional local and/or network data that is unrelated to the browser and API 603, 604, for instance used by the one or more further applications 605 and/or the OS 601 and generally shown at 610.

Figure 7:
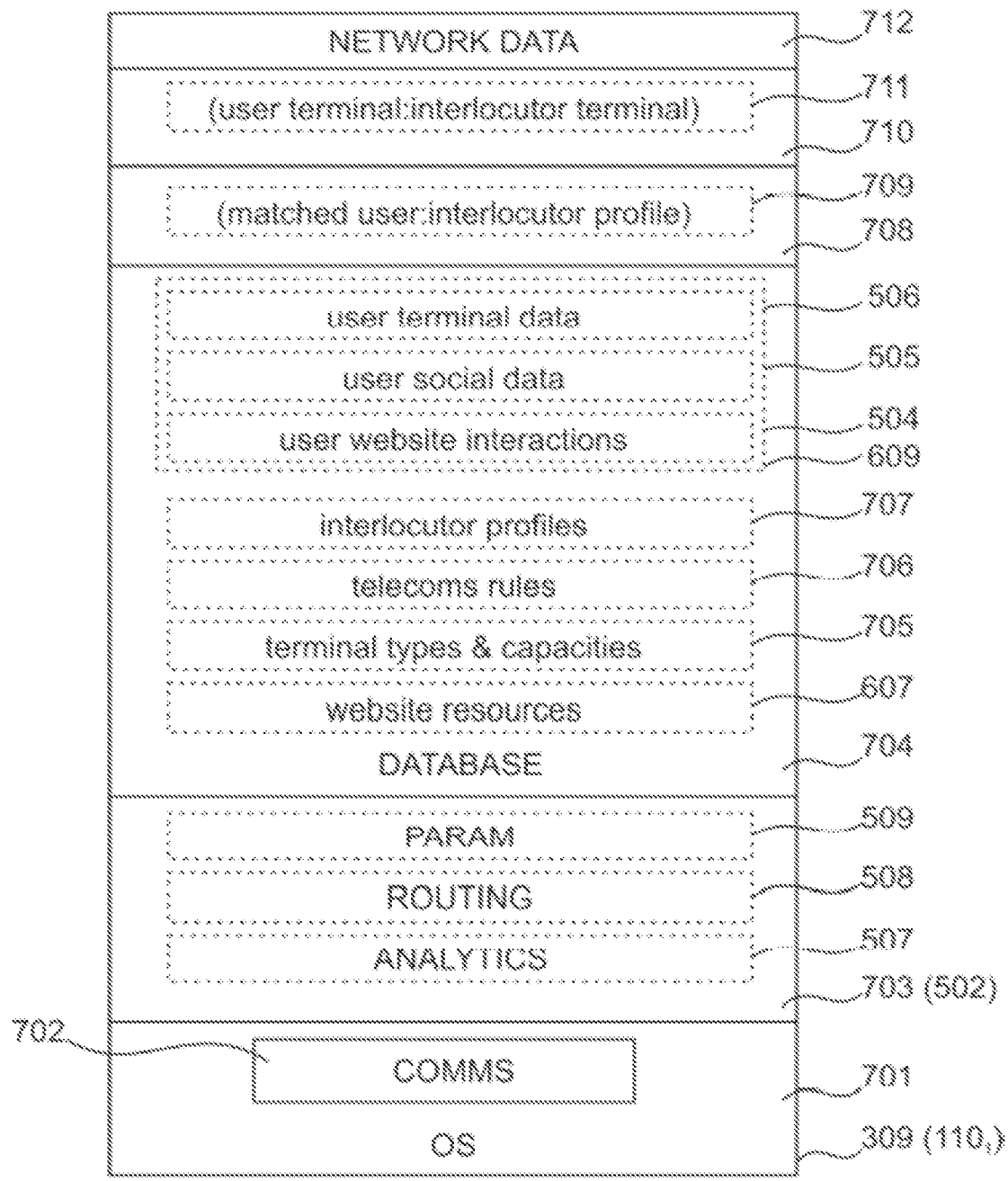
FIG. 7 is a logical diagram of the contents of the memory means of a first data processing terminal shown in FIGS. 1 and 3, when performing the method of FIG. 4 as a server, including the first set of instructions and captured interaction data of FIG. 6, a second set of instructions, analyzed interaction data and a database.

FIG. 7 is a logical diagram of the contents of the memory means of the data processing terminal $110_1$ shown in FIGS. 1 and 3, when performing the method of FIG. 4 as a server at runtime, including the first set of instructions and captured interaction data, a second set of instructions, analyzed interaction data and a database, as illustrated in FIGS. 5 and 6.

An operating system is shown at 701 which, if the terminal $110_1$ is a desktop computer, is for instance Windows 7™ distributed by the Microsoft Corporation. The OS 701 includes communication subroutines 702 to configure the terminal for bilateral network communication in the network environment of FIG. 1 via the NIC 311, then the router 109.

The server application 502 is shown at 703, which configures the terminal $110_1$ to perform at least processing steps 401, 402, 404, 405, 407, 408, 410, 412 to 414 and 416, 417 as described hereinbefore, and which is interfaced with the OS 601 and network communication subroutines 602 thereof via one or more suitable Application Programmer Interfaces. Accordingly, the server application includes the analytics module 507, the routing module 508 and the parameterizing module 509 as previously described, and is therefore apt to request and obtain authentication data, identity verification data and captured interaction data 609 from each remote user accessing the website resources 607.

A database is accordingly shown at 704, in which the website resources 607 are stored, as well as terminal types and capacities 705 for interlocutors and users, telecommunication rules 706 and interlocutor profiles 707 as established at steps 401, 402, and the user session records comprising the captured interaction data 609 for each remote user accessing the website resources 607.

Server application data specific to the analytics module 507 is shown at 708, which includes user analyzed data 709 such as interaction patterns processed at step 412 and matched user-interlocutor pairs 710 pursuant to step 413.

Server application data specific to the routing module 508 is shown at 711, which includes user terminal—interlocutor terminal communication paths 712 output by the analytics module 507 for perusing by the routing module.

The memory 309 may further comprise conventional local and/or network data that is unrelated to the server application 703, for instance used by the one or more further applications and/or the OS 601 and generally shown at 713.

Figure 8:
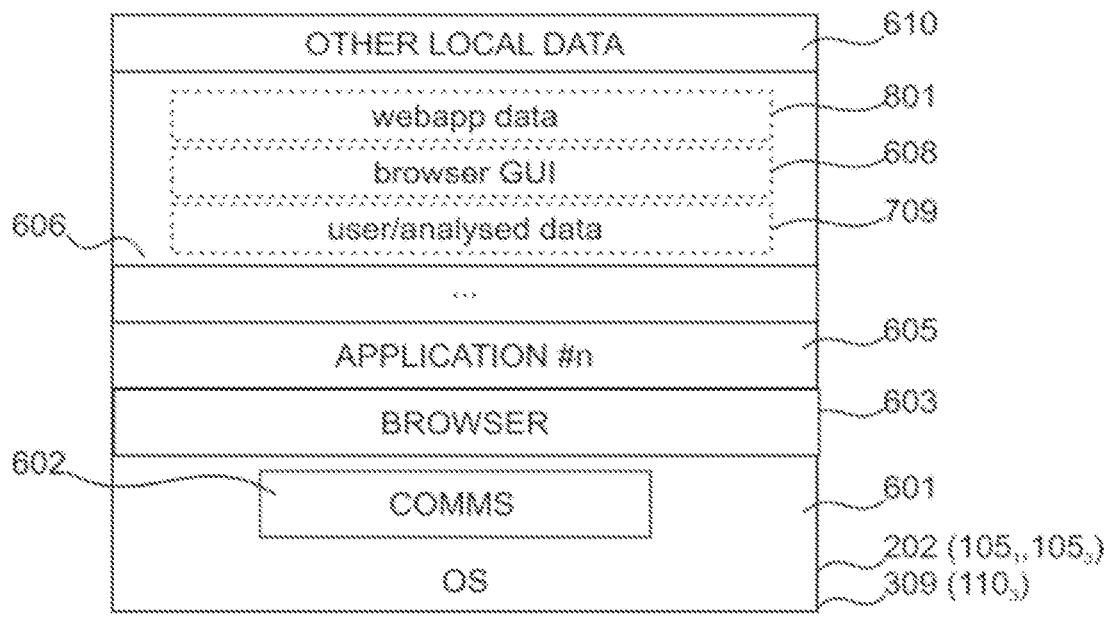
FIG. 8 is a logical diagram of the contents of the memory means of another data processing terminal shown in FIGS. 1 and 3, when performing the method of FIG. 4 as an interlocutor terminal, including a browser and the analyzed data of FIG. 7.

FIG. 8 is a logical diagram of the contents of the memory means 202 of an interlocutor mobile terminal $105_1$, $105_3$ as shown in FIGS. 1 and 2, when performing the method of FIG. 4 at runtime, including a website in a browser and analyzed interaction data as illustrated in FIGS. 5 to 7. It will be readily understood by the skilled person that the foregoing is applicable to the alternative memory means 309 of an interlocutor static terminal $110_3$ as shown in FIGS. 1 and 3, when performing the method of FIG. 4 at runtime.

An operating system is firstly shown at 601 which, depending on the handset manufacturer, may be an iOS version developed and distributed by Apple Inc. or Android™ developed and distributed by Google Inc. A subset of instructions 602 of the OS 601 is dedicated to communication processing, in particular data communications with remote terminals $105_N$, $110_N$ within the network environment of FIG. 1.

A browser application is shown at 603, which configures the mobile handset $105_2$ to process and display a distributed or local call support application. The memory 202 may comprise one or more further applications being processed in parallel with the browser 603 at runtime, that is or are unrelated to the present invention and generally shown at 605.

Browser application data is shown at 606, which comprises downloaded support application resources 801 and a graphical user interface 608 output to the display 210 and into which the downloaded resources are rendered.

In the case of the interlocutor terminal, in this embodiment the browser application data also comprises analyzed user data, which consists of the output of the server application communicated to the interlocutor terminal $105_3$ at step 417. In an alternative embodiment (not shown) the remote server $110_1$ may also forward, or forward instead, thus the browser application data of the interlocutor terminal $105_3$ may further or alternatively comprise, some or all of the captured user data 609 received by the remote server $110_1$ prior to analysis. In either case, the analyzed and/or captured data is forwarded by the remote server $110_1$ for ad hoc referencing purposes or otherwise, so that the interlocutor has as much call supporting information at hand as is available in order to facilitate the telecommunication with the calling user.

The memory 202 may again further comprise conventional local and/or network data that is unrelated to the browser 603, for instance used by the one or more further applications 605 and/or the OS 601 and generally shown at 610.

The present invention thus provides a computer-implemented method and a corresponding system comprising means for communicating at least one API to one or more network resources, typically a website or a mobile application site; means for routing interactions from each user accessing and browsing the or each network resource to an interlocutor, or a group thereof, of the entity respectively associated with the or each network resource, typically a company or other goods or service provider; and at least one API configured to allow the passing of interaction data gathered as the user accesses the network resource, optionally through a social media-based authentication procedure, then browses it. This gathered data is used by the routings means, a typical embodiment of which may be an analytics routing application processed by a server, in order to select the interlocutor or group thereof with the attributes most closely corresponding to the anticipated requirements of the user at the time the user initiates a telecommunication.

Many implementing variations may be devised by the skilled person in dependence upon requirements of increased functionality, simplicity of implementation, availability of data processing and network bandwidth, scalability and more. Accordingly, there follows comments about, and brief descriptions of, alternative embodiments, all of which are provided by way of non-limitative example and readily associated with the environment of FIGS. 1 to 3 at least.

The routing functionality, in its simplest form, may rely upon meta-data keywords associated with the originating webpage of a website, i.e. the webpage on which a 'Click to Call' or 'Chat' user-selected button has been selected with the pointing device 304, and the ensuing telecommunication routed to one or a group of interlocutors that have preferably been associated with those keywords by a user of the server $110_1$.

Similarly, such a server $110_1$ can associate one or more interlocutors with search terms that commonly are entered in the website, after analyzing historical search data input to the server. An implementation routine may for instance monitor each website search event followed by the initiation of an interaction request from the search results page by a remote user accessing the website.

The system 100 may likewise use the output of the customer behavioral data analysis 506, such as browsing history or click stream, to augment keyword-based routing and improve the accuracy of routing interactions to the most suitable agents. This is achieved through the following mechanisms.

A server user can define, with the parametering module 508, a set of hard routing constraints that associate selected meta-data keywords of the originating website page and the interlocutor skillsets. Such mappings will ensure particular routing constraints, for example that telecommunications originating from a web page in French will be routed to a French-speaking interlocutor.

In addition, the system 100 continuously collects user behavioral data for each web session through tracking beacons (JavaScript snippets embedded in the website, similarly to Google Analytics) that are passed to the user-facing API. This data, including web pages, which the user visited prior to making the call, is used to identify categories of users (persona clusters) and telecommunication steps (journey patterns) with a chosen clustering algorithms (e.g. Support Vector Machines that are known in the art). This information when also rendered on an interlocutor desktop application 801 provides valuable information on user activity prior to the call.

The system 100 automatically assigns the telecommunication to one of the computed categories and identifies in real-time the most accurate routing decisions using prior knowledge (e.g. success of each interlocutor with similar calls) that can be implemented using a number of typical supervised machine-learning approaches relevant in this scenario.

Similarly, user behavioral data that may include user actions or location is also gathered for mobile app users through the mobile beacons mechanism and the user-facing API. The collected information is used similarly to the web session data, allowing identification of persona clusters and journey patterns with selected machine learning techniques. Historical telecommunication data is used to enhance routing decisions based on the success of previous routing decisions. It is also presented on an interlocutor desktop application 801 to provide more contextual information about the call to the interlocutor.

Location services can resolve IP addresses into relatively accurate street addresses and GPS co-ordinates obtained via the GPS module 206 can be mapped using web services like Google Maps among others. This information when rendered on an interlocutor desktop application 801 provides information to an interlocutor for resolving categories of enquiry from users that require knowing where a user is geographically relative to services, field personnel or premises.

Users may choose to make their social data available to the system by authenticating on the website per step 405, 406 or when initiating the call. Social data is invaluable for personalization through identification of user demographics, interests and likes. The system 100 can use this information to route the user to the most suitable interlocutor, but also to compute more accurate recommendations, such as on call up-sell recommendations displayed in the interlocutor desktop application 801.

The invention accordingly allows use of the rich contextual data from the actual website page browsing and activities carried out by the user as the inputs to determine the routing of the telecommunication and analysis of this data to provide further values such as pre-emptive offering of interlocutor assistance at critical points in the user journey and recommendations to the interlocutor to increase the value of the telecommunication.

Meta keywords (e.g. "<meta name="keywords" content="Sales, Car Insurance"/>") of the web page from which the user originated the telecommunication is used to map the telecommunication to a set of interlocutors assigned to handle telecommunications associated with specific keywords.

Search terms input by the user prior to initiating the telecommunication are used to route the telecommunication to the set of interlocutors associated with those search terms. Data collected from previous browsing activity and telecommunications may also be used to categorize the user and route the telecommunication to the interlocutor predicted to be the best fit for a given category. Data identifying a website page that the user has browsed on the website is passed via an API to the system and this browse sequence may be used to route the telecommunication to an interlocutor compared to historical data representative of the interlocutors who were rated best to handle the telecommunication request by previous users.

An analysis of the browsing activities by a user can predictively determine that the user will call and can therefore begin queuing a telecommunication in the system in anticipation of this call, so that the user is answered more quickly when a call is initiated by a user. In one embodiment based on the aggregation and analysis of user browsing patterns, a call can be offered to a user with a pre-reserved interlocutor at a critical point in a user journey through the website resources 607 to optimize user satisfaction.

Referring again to FIG. 5 in one embodiment of the invention the captured data is analyzed based on a pattern and used to predict a successful outcome between the first user and a selected second user, i.e. the interlocutor or agent acting for the website being browsed by the first user, by the analytics module 507. The invention utilizes a set of interaction management processes that takes a set of inputs that include raw user online data (website data, behavior data, demographics data), hard constraints configuration (agent and queue assignment) and analytics data in various forms (e.g. smart attributes derived based on the analysis of raw data using machine learning, such as need or likelihood to achieve a specific outcome (which can change dynamically during a customer journey), such as purchase a product, book a demo, require support, likelihood of accepting an interaction offer) in order to make interaction management decisions that can include: identification of customer most valuable within a persona set given an outcome to maximize, smart call routing based on agent efficiency clusters, interaction recommendations to agents (what type of interaction—chat/audio/video—should be offered to which users and when), as well as automatic interaction offers focused on shaping customer journey and optimizing the business outcomes.

In one embodiment the system takes the following inputs:
1. Raw user behavior data—such as mobile data, social data
2. Hard constraints configurations—rules ensuring that particular business-defined constraints are met. Examples may include call routing or interaction offer based on user online data.
3. A set of Outcomes that the business wants to maximize, which are defined as a set of actions executed by the customer, e.g. purchase a product, book a demo or complete a form.
4. Analytics data constitutes the key input for the system. Examples of such data includes: smart attributes (e.g. need for support, propensity to complete an outcome) derived based on raw user data using machine learning algorithms, persona clusters that dynamically group users based on their behavior and demographics, as well as journey patterns representing similar set of sequences of user actions.

The analytics module 507 takes the inputs and processes the data using the analytics data. The outputs can be Machine Learned "smart attributes" ranking customers against Outcomes defined by the business and within Persona Clusters assigned by the Machine Learning or specified by the business associated with the website.

The outputs can be interaction recommendations. The routing module 508 is configured to make interaction recommendations to agents providing the agent with contextual data learned about the users (e.g. likelihood of accepting an interaction offer, likelihood of purchasing a product) based on inputs provided. For example, analytics module 507 can identify the users that the agent should offer chat interactions to in order to increase product sales. This allows agents to focus on users or customers with predicted high value with respect to a given outcome, thus optimizing the resource utilization.

The outputs can be automatic interaction offers. The analytics module 507 can make informed decisions and automatically offer interaction to selected users. Such interaction offers are made based on the analytics data in order to optimize the business-defined outcomes. First, using the input data (as described above) the component identifies the set of customers that are of high value with respect of a given outcome. Appropriate treatment (i.e. interaction offer) is then identified using predictive models built using various machine learning algorithms including decision trees, Bayesian inferencing and neural networks. The analytics module 507 can be configured to determine how many interaction offers should be automatically made to customers in order to maximize agent utilization and minimize users' or customers' queuing time.

The routing module 508 makes routing decisions and performs agent selection based on inputs provided (as outlined above) using machine learned inference based on persona attributes (age, location, role, gender, etc.) and activities (page views, calls, chat, etc.)—Customers with similar personae and activities patterns do better with Agents like Agent X, customer X is should have an agent reserved as they are about to make a call or the system has offered them an interaction and they are likely to accept.

The embodiments in the invention described with reference to the drawings comprise a computer apparatus and/or processes performed in a computer apparatus. However, the invention also extends to computer programs, particularly computer programs stored on or in a carrier adapted to bring the invention into practice. The program may be in the form of source code, object code, or a code intermediate source and object code, such as in partially compiled form or in any other form suitable for use in the implementation of the method according to the invention. The carrier may comprise a storage medium such as ROM, e.g. CD ROM, or magnetic recording medium, e.g. a floppy disk or hard disk. The carrier may be an electrical or optical signal, which may be transmitted via an electrical or an optical cable or by radio or other means.

Additionally, at least a portion of the systems, methodologies and techniques described with respect to the exemplary embodiments of present disclosure can incorporate a machine, such as, but not limited to, computer system, or any other computing device within which a set of instructions, when executed, may cause the machine to perform any one or more of the methodologies or functions discussed above. The machine may be configured to facilitate various operations conducted by the systems disclosed herein. For example, the machine may be configured to, but is not limited to, assist the systems by providing processing power to assist with processing loads experienced in the systems, by providing storage capacity for storing instructions or data traversing the systems, or by assisting with any other operations conducted by or within the systems.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but are not limited to, distributed processing or component/object distributed processing, parallel processing, or virtual machine processing can also be constructed to implement the methods described herein.

In the context of the present invention it will be appreciated that the term 'website' should be provided a broad interpretation to include mobile application sites, apps downloaded onto a terminal and capable of communicating with a portal or IP address or any communication means that facilitates communication over a network.

In the specification the terms "comprise, comprises, comprised and comprising" or any variation thereof and the terms include, includes, included and including" or any variation thereof are considered to be totally interchangeable and they should all be afforded the widest possible interpretation and vice versa.

The invention is not limited to the embodiments hereinbefore described but may be varied in both construction and detail.

It will be apparent to those skilled in the art that numerous modifications and variations of the described examples and embodiments are possible in light of the above teaching. The disclosed examples and embodiments are presented for purposes of illustration only. Other alternate embodiments may include some or all of the features disclosed herein. Therefore, it is the intent to cover all such modifications and alternate embodiments as may come within the true scope of this invention.

What is claimed is:

1. A method for capturing and analyzing pattern-based data and using the analysis to predict a desired outcome between a first user and selected second user from a plurality of users, wherein the selected second user is affiliated with a contact center associated with a website being browsed by the first user, the method comprising:
   collecting a set of inputs around the browsing of the first user of the website via an Application Programming Interface, wherein the Application Programming Interface transmits the set of inputs to a data processor, the set of inputs comprising demographic data and browsing behavior data that includes a stream of selections made by the first user while browsing the web site and a search string input by the first user while browsing the website for locating resources associated with the web site
   analyzing the set of inputs by the data processor, wherein the analyzing further comprises:
      an application of machine learning to the set of inputs to derive attributes,
      assigning a persona cluster to the first user that dynamically groups the first user with a plurality of other users based on the browsing behavior data and the demographics data, and
      examining journey patterns representing a similar set of sequences of other user actions of the plurality of other users to user actions of the first user; and
   performing a management decision on an interaction related to the first user based on the set of inputs analyzed to achieve the desired outcome, the performing the management decision comprises determining a ranked list for the desired outcome that comprises a listing of users ranked in order of likelihood of completing the desired outcome; and
   offering the ranked list to the selected second user for making a selection therefrom and receiving from the selected second user a selection in which the selected second user selects the entry related to the first user of the users of the ranked list;

wherein the set of inputs further comprises hard constraints configurations of the contact center, a set of outcomes that a business affiliated with the website wants to maximize, and social media data related to the first user; and wherein each entry on the listing of users identifies a particular user, a particular action to take in relation to the particular user, and a timing for taking the particular action, and the performing the management decision comprises completing the action related to the first user in accordance with the selected entry.

2. The method of claim 1, wherein the hard constraints configurations comprise one or more of: second user and queue assignment, interaction routing based on data of the first user, interaction offers based on data of the first user, and rules.

3. The method of claim 1, wherein the set of outcomes comprise a set of actions executed by the first user.

4. The method of claim 1, wherein the machine learning algorithms create outputs of attributes ranking the plurality of second users against outcomes defined by the contact center and within the persona clusters.

5. The method of claim 1, wherein the management decision comprises identification of the first user as a valuable user within a persona set given an outcome to maximize.

6. The method of claim 1, wherein the management decision comprises smart interaction routing based on agent efficiency clusters.

7. The method of claim 1, wherein the management decision comprises interaction type recommendations to the selected second user to offer to the first user and offer timing.

8. The method of claim 1, wherein the management decision comprises automatic interaction offers to the first user focused on shaping customer journey.

9. The method of claim 1, wherein the management decision comprises automatic interaction offers to the first user focused on optimizing outcome.

10. The method of claim 1, wherein the desired outcome comprises avoiding an outcome the contact center wants to avoid.

11. The method of claim 1, wherein the outcome is captured in a binary fashion at the end of the interaction and formed into a feedback loop for pattern understanding used in the machine learning.

12. The method of claim 1, wherein the action comprises at least one of: a voice call, a chat, an email, and a web page suggestion.

* * * * *